US006579948B1

(12) United States Patent
Tan et al.

(10) Patent No.: US 6,579,948 B1
(45) Date of Patent: Jun. 17, 2003

(54) SELF-ASSEMBLED SULFONATED BLOCK COPOLYMER SEMIPERMEABLE MEMBRANE AND USES THEREFOR

(75) Inventors: Nora C. Beck Tan, Perryville, MD (US); Dawn M. Crawford, Bel Air, MD (US); James M. Sloan, Bel Air, MD (US); Eugene Napadensky, Newark, DE (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/716,967

(22) Filed: Nov. 22, 2000

Related U.S. Application Data (60) Provisional application No. 60/168,419, filed on Nov. 24, 1999.

(51) Int. Cl.$^7$ .................................................. C08F 8/38
(52) U.S. Cl. ............................... 525/333.5; 428/308.4; 428/308.8; 525/344
(58) Field of Search .............................. 525/333.5, 344; 428/308.4, 308.8

(56) References Cited

U.S. PATENT DOCUMENTS

| | | | | |
|---|---|---|---|---|
| 4,686,137 A | * | 8/1987 | Ward et al. | 442/76 |
| 5,120,813 A | * | 6/1992 | Ward, Jr. | 528/28 |
| 5,207,908 A | * | 5/1993 | Koenhen et al. | 210/490 |
| 5,256,181 A | * | 10/1993 | Manalastas et al. | 71/28 |
| 5,480,953 A | * | 1/1996 | Sugaya et al. | 526/320 |
| 5,679,482 A | * | 10/1997 | Ehrenberg et al. | 429/249 |
| 5,861,023 A | * | 1/1999 | Vachon | 607/121 |
| 6,110,616 A | * | 8/2000 | Sheikh-Ali et al. | 429/33 |
| 6,306,419 B1 | * | 10/2001 | Vachon et al. | 424/422 |

\* cited by examiner

*Primary Examiner*—Bernard Lipman
(74) *Attorney, Agent, or Firm*—Paul S. Clohan, Jr.; William V. Adams (57) ABSTRACT

A semipermeable membrane that is capable of remaining flexible at a temperature of at least −60° C. is selective to liquid penetrants depending on the size and polarity of the penetrants, and more specifically, the membrane has sufficient selectivity so as to be capable of allowing water to diffuse therethrough at a higher rate than virtually all organic liquids having a molecular weight higher than that of methanol. The semipermeable membrane, which is produced from an unsulfonated block copolymer having polystyrene and polyisobutylene segments, includes a sulfonated block copolymer including poly (styrene-co-styrene sulfonic acid) segments and polyisobutylene segments. Prior to modification by sulfonation, the unsulfonated polystyrene and polyisobutylene block copolymer includes polystyrene monomer in an amount of from 5% to 90% by weight of the total unsulfonated block copolymer. After modification, from 1 to 70 mole % of the polystyrene monomer in the unsulfonated polystyrene and polyisobutylene block copolymer is converted to styrene sulfonic acid in the sulfonated block copolymer. By virtue of the semipermeable membrane's excellent transport and mechanical properties, and ease of processing, the various embodiments of the membrane advantageously find numerous uses, including in chemical and/or biological protective apparel, as an ion-conducting membrane for use in a fuel cell, and in medical equipment and apparel.

26 Claims, 8 Drawing Sheets

SELF-ASSEMBLED SULFONATED BLOCK COPOLYMER SEMIPERMEABLE MEMBRANE AND USES THEREFOR

This application claims the priority of U.S. Provisional Application No. 60/168,419 filed Nov. 24, 1999, and incorporated herein by reference.

The invention described herein may be manufactured, used, and licensed by the U.S. Government for governmental purposes without the payment of any royalties thereon.

BACKGROUND OF THE INVENTION

1. Field of the Invention

This invention relates generally to a semipermeable membrane, and the various uses therefor. The invention relates more specifically to a semipermeable membrane comprising a self-assembled sulfonated block copolymer comprising poly (styrene-co-styrene sulfonic acid) segments and polyisobutylene segments.

2. Description of the Related Art

Various permeable materials having a wide range of mechanical and transport properties are known. Depending upon the particular application in which the permeable material is to be employed, however, certain combinations of properties are required.

For example, in a protective apparel application, it may be desirable that the material transport air and water vapor while blocking the transport of harmful chemicals, and be lightweight and flexible over a broad temperature range.

The U.S. Army has multiple requirements for chemical and biological protective materials. Butyl rubber is often used in standard protective clothing. However, garments made from butyl rubber are bulky and nearly impermeable to air and moisture (I. Lee, Yang and Wilusz; *Polymer Engineering & Science*, 1996, 36, 1217), resulting in unbearable levels of heat inside the garments during use.

In an apparel application, therefore, a need exists for a material that provides the requisite level of protection, but that is also semipermeable, i.e., one that allows air and moisture to permeate the garments to the extent necessary to afford comfort to the wearer.

Various references describe semipermeable materials produced from a variety of polymers. For example, U.S. Pat. No. 4,305,823 describes polymers from the group consisting of cellulose and its ester and ether derivatives, of polyvinyl alcohol and its ester derivatives, copolymers with vinyl esters and homopolymers and copolymers of acrylates and methacrylates modified with monofunctional or difunctional cyclic β-ketonic acids or their esters. The modified polymers are disclosed as being suitable, however, for osmotic separation methods.

U.S. Pat. No. 4,686,137 describes polymeric materials characterized by hard segments and copolymer soft blocks comprising hydrophobic and hydrophilic components. There is no mention, however, of blocking chemicals/liquids/penetrants other than water. Similarly, U.S. Pat. No. 5,120,813 discloses simply the selective permeation of water vapor over liquid water.

U.S. Pat. No. 5,480,953 discloses membranes, but with a chemistry based primarily on polyalkylene oxides and acrylic or methacrylic ester.

U.S. Pat. No. 6,110,616 discloses the synthesis of statistical styrene-hyrogenated butadiene copolymers (as opposed to block copolymers) to make sulfonated membranes, and the application of these materials into fuel cells, and requires greater than 30% sulfonation of the styrene components.

U.S. Pat. No. 5,679,482 discloses sulfonated block copolymers of polystyrene and hydrogenated ethylene-butadiene. The base polymer, SEBS, is sulfonated to a level of greater than 25 mol %.

Therefore, although different approaches have been taken to address the need for different permeable materials in different technologies, no single material has emerged which satisfies all of the technical requirements and which presents a cost-effective alternative. More specifically, none of the aforementioned references provides a semipermeable membrane that exhibits the necessary combination of desirable properties so as to render it suitable for use in a wide variety of applications.

SUMMARY OF THE INVENTION

It is an object of the present invention to provide a semipermeable membrane that displays a combination of mechanical properties, low temperature flexibility, selective transport, ease of processability, and cost-effectiveness, so as to render it suitable for use in a wide variety of applications.

Accordingly, the present invention relates to a semipermeable membrane comprising sulfonated forms of polystyrene ("PS") and polyisobutylene ("PIB") base block copolymers. A major component of the copolymer is polyisobutylene, which lends low temperature flexibility to the material, and good barrier properties. Polystyrene forms the glassy component, which aggregates within the PIB matrix, thereby lending mechanical integrity to the copolymer.

The thermodynamic immiscibility of the two components results in spontaneous microphase separation. The PS block is modified such that the PS microphase provides a channel for water transport, while the PIB matrix acts as a chemical barrier.

Modification of the PS blocks is performed by conversion of the styrene monomer to styrene-sulfonic acid. The sulfonated block copolymer exhibits a hydrophilic character, and is capable of selectively transporting water. Sulfonation of the polymer does not adversely effect the material's flexibility over a broad temperature range, or its solubility in common solvents, which makes processing economically feasible.

Accordingly, in a first embodiment, the present invention relates to a semipermeable membrane produced from an unsulfonated block copolymer comprising polystyrene and polyisobutylene segments, in which the semipermeable membrane comprises a sulfonated block copolymer comprising poly (styrene-co-styrene sulfonic acid) segments and polyisobutylene segments. Prior to modification by sulfonation, the unsulfonated polystyrene and polyisobutylene block copolymer comprises polystyrene monomer in an amount of from 5% to 90% by weight of the total unsulfonated block copolymer. After modification, from 1 to 70 mole % of the polystyrene monomer in the unsulfonated polystyrene and polyisobutylene block copolymer is converted to styrene sulfonic acid in the sulfonated block copolymer.

In another embodiment of the invention, the semipermeable membrane can be employed in a semipermeable laminate. The laminate comprises (a) one or a plurality of semipermeable membrane layers produced from an unsulfonated block copolymer comprising polystyrene and polyisobutylene segments, with the membrane layer comprising a sulfonated block copolymer comprising poly (styrene-co-styrene sulfonic acid) segments and polyisobutylene segments, wherein the unsulfonated polystyrene and polyisobutylene block copolymer comprises polystyrene monomer in an amount of from 5% to 90% by weight of the total unsulfonated block copolymer, and wherein from 1 to 70 mole % of the polystyrene monomer in the unsulfonated polystyrene and polyisobutylene block copolymer is converted to styrene sulfonic acid in the sulfonated block copolymer; and (b) a substrate, such as, for example, a fabric.

In still another embodiment, the invention can be employed as a semipermeable layer. The semipermeable layer comprises the aforementioned semipermeable membrane, and a substrate, wherein the membrane is dispersed throughout the substrate.

Finally, by virtue of the semipermeable membrane's excellent transport and mechanical properties, and ease of processing, the various embodiments of the membrane advantageously find numerous uses, including in chemical and/or biological protective apparel, as an ion-conducting membrane for use in a fuel cell, and in medical equipment and apparel.

BRIEF DESCRIPTION OF THE DRAWINGS

Other objects, features, and advantages of the present invention will become more fully apparent from the following detailed description of the preferred embodiments, the appended claims, and the accompanying drawings. As depicted in the attached drawings:

DESCRIPTION OF THE PREFERRED EMBODIMENTS

The present invention will be disclosed in terms of the currently perceived preferred embodiments thereof.

The present invention fulfills a need for a semipermeable membrane that displays an impressive combination of mechanical properties, low temperature flexibility, selective transport, ease of processability, and cost-effectiveness. The semipermeable membrane is, therefore, an outstanding candidate for numerous and varied applications.

The present invention is directed to an advanced polymeric material for use as a semipermeable membrane in various applications, including, for example, chemical and/ or biological protective clothing, a separation membrane, a fuel cell membrane, and medical equipment and apparel. The self-assembled, sulfonated copolymer is a flexible, solid material with membrane characteristics that i) facilitate the transport of water vapor, for example, from a wearer of membrane-containing apparel to the atmosphere, thus reducing heat stress, and ii) block entry of certain organic compounds. Because test data have proven that membranes fabricated from this material are effective at blocking relatively low molecular weight compounds such as acetonitrile and butanol, it can be presumed that these membranes will be very effective at blocking higher molecular weight compounds.

In a first embodiment of the invention, therefore, the semipermeable membrane produced from an unsulfonated block copolymer comprising polystyrene and polyisobutylene segments comprises a sulfonated block copolymer comprising poly (styrene-co-styrene sulfonic acid) segments and polyisobutylene segments. Prior to modification by sulfonation, the unsulfonated polystyrene and polyisobutylene block copolymer comprises polystyrene monomer in an amount of from 5% to 90% by weight of the total unsulfonated block copolymer. After modification, from 1 to 70 mole % of the polystyrene monomer in the unsulfonated polystyrene and polyisobutylene block copolymer is converted to styrene sulfonic acid in the sulfonated block copolymer.

In one embodiment of the semipermeable membrane, the copolymer is based on a block copolymer comprising a tri-block of polystyrene-polyisobutylene-polystyrene ("PS-PIB-PS"). The major component of the base polymer is PIB (70% by weight), which lends both low temperature flexibility to the polymer, and high barrier properties (i.e., preventing penetration by the organic compounds). PS, present in an amount of 30% by weight, forms the glassy component. In the solid state, the thermodynamic immiscibility of the two components results in a microphase separation where domains of PS are formed in the rubbery PIB matrix. The fraction of PS controls the morphology that is formed in the copolymer, which can be, for example, cylinders, lamellae, spheres, or more complex morphologies.

A microphase separated morphology is key for imparting the semipermeable characteristics, because the PS microphase provides a connected "channel" through the film thickness, thereby providing a mechanism for water transport. To enable water transport across the membrane, modification of the base polymer is required.

Self-assembled morphologies occur in block copolymers that are composed of thermodynamically immiscible constituent blocks (Lu, et al., *Macromolecules*, 1993, 26, 6525). While related block copolymers have been reported in the literature (e.g., Weiss, R. A., Sen, A., Willis, C. L., Pottick, L. A., *Polymer*, 1991, 32, 1867; Lu, X., Steckle, W. P. Jr., Hsiao, B., Weiss, R. A., *Macromolecules*, 1995, 28, 2831; and Mani, S., Weiss, R. A., Hahn, S. F., Williams, C. E., Cantino, M. E., Khairallah, L. H., *Polymer*, 1998, 39, 2023), the block copolymer of the present invention is characterized by unique properties which facilitate its potential use in a wide variety of applications.

Modification of the base PS and PIB copolymer is performed by sulfonation. That is, modification of the PS blocks is performed by conversion of a portion of the styrene monomer to styrene-sulfonic acid (see, e.g., Mountz, D. A., Reuschle, D. A., Brister, L. B., Storey, R. F., Mauritz, K. A., *ACS Polymer Preprints*, Spring 1997, 39, 383, where approximately 21% of the styrene monomers were converted to styrene-sulfonic acid).

The sulfonated copolymer exhibits a hydrophilic character, and its ability to selectively transport water has been demonstrated. Sulfonation of the polymer does not adversely effect the material's flexibility over a broad temperature range, or its solubility in common solvents, which makes processing economically feasible.

The sulfonated copolymer exhibits the proper chemistry and morphology for water vapor transport, while the PIB matrix functions as a chemical barrier, thus, selective permeation characteristics are achieved. Sulfonation of the polymer results in a stiffer material without changing the glass transition temperature. Therefore, the material remains flexible and transparent following the chemical modification.

The PS and PIB block copolymer in both the unmodified and sulfonated forms readily dissolves in organic solvents, making large scale processing economically feasible. While solution processing was the method utilized to produce the semipermeable membranes described herein, the thermoplastic nature of the block copolymers also enables the use of other techniques, such as melt processing.

It has been demonstrated that the unmodified polymer exhibits changes in polymer morphology as a function of the rate of solvent evaporation. Slower evaporation times lead to improved long-range order. However, these changes in morphology do not affect the permeation properties of the copolymer. Data indicate that the block copolymer in the unmodified form behaves as a barrier material, blocking water and polar organic compounds. Modification via sulfonation of styrene components of the polymer chain disrupts the morphology of the copolymer with little change observed as a function of processing method. Details of the polymer morphology with regard to processing conditions can be found in Crawford, D. M., Napadensky, E., Beck Tan, N. C., Reuschle, D. A., Mountz, D. A., Mauritz, K. A., Laverdure, K. S., Gido, S. P., Liu, W., Hsiao, B., "Structure/Property Relationships in Polystyrene-Polyisobutylene-Polystyrene Block Copolymers,"*Thermochimical Acta*, In Press.

Solution processing of sulfonated PS-PIB-PS under nonequilibrium conditions (solvent casting or spraying), results in films with microphase separated morphology, and permselective characteristics. The observed properties of the sulfonated block copolymers, coupled with their ease of processing, demonstrate their suitability for numerous applications requiring a semipermeable membrane.

In another embodiment of the semipermeable membrane, the unsulfonated block copolymer comprising polystyrene and polyisobutylene segments comprises polystyrene monomer in an amount of from 5% to 60% by weight of the total unsulfonated block copolymer, and up to 50 mole % of the polystyrene monomer in the unsulfonated polystyrene and polyisobutylene block copolymer is converted to styrene sulfonic acid in the sulfonated block copolymer.

In another embodiment of the semipermeable membrane, the unsulfonated block copolymer comprising polystyrene and polyisobutylene segments comprises polystyrene monomer in an amount of from 10% to 50% by weight of the total unsulfonated block copolymer, and from 1 to less than 30 mole % of the polystyrene monomer in the unsulfonated polystyrene and polyisobutylene block copolymer is converted to styrene sulfonic acid in the sulfonated block copolymer.

In still another embodiment of the semipermeable membrane, the unsulfonated block copolymer comprising polystyrene and polyisobutylene segments comprises polystyrene monomer in an amount of from 20% to 70% by weight of the total unsulfonated block copolymer, and at least 20 mole % of the polystyrene monomer in the unsulfonated polystyrene and polyisobutylene block copolymer is converted to styrene sulfonic acid in the sulfonated block copolymer.

In a typical embodiment, the block copolymer can be a polystyrene-polyisobutylene-polystyrene tri-block copolymer. Other embodiments can include, however, diblock copolymers, multiblock copolymers, graft copolymers, and polymer networks.

In an optional embodiment, the semipermeable membrane can further comprise an additive selected from the group consisting of polymers, chemical stabilizers, bio-active species, and metals, and mixtures thereof. The chemical stabilizer can be, for example, an anti-oxidant, and the bio-active species can be an antiseptic.

In another optional embodiment of the semipermeable membrane, a proton of the sulfonic acid segment is replaced with an organic or inorganic cation. The organic or inorganic cation can be of essentially any valency.

In a typical embodiment, the semipermeable membrane can have a thickness of up to about 5 mm, i.e., from an extremely small thickness up to about 5 mm. In a more typical embodiment, the semipermeable membrane has a thickness of from about 0.05 mm to about 2 mm. Other thicknesses can of course be employed, however, depending upon the particular application in which the membrane is to be employed.

A significant advantage of the semipermeable membrane is that the membrane is capable of remaining flexible at a temperature of at least −60° C. The lower limit of flexibility is defined as the glass transition temperature of the rubbery (i.e., PIB) phase, defined as the temperature of the peak in a plot of the dynamic loss modulus (E") versus temperature. Although the block copolymer exhibits increased stiffness at higher levels of sulfonation, the elastomeric properties of the block copolymer are not compromised, and the temperature of the PIB glass transition remains at approximately −60° C. This suggests that the sulfonated block copolymer will remain flexible over a broad temperature range, as is required in applications such as protective clothing.

Another significant advantage of the semipermeable membrane is that the membrane is selective to liquid penetrants depending on the size and polarity of the penetrants. More specifically, the membrane has sufficient selectivity so as to be capable of allowing water to diffuse therethrough at a higher rate than virtually all organic liquids having a molecular weight higher than that of methanol.

Transport of water and alcohols through the copolymers was studied using attenuated total reflectance (ATR) FTIR. Alcohols were chosen as penetrants, because they represent small diffusing molecules that vary in both size and polarity. From these experiments, breakthrough times and diffusion coefficients for penetrants were measured. From this it was determined that breakthrough time for water and alcohols is a function of sulfonation level, i.e., the breakthrough times clearly decrease as sulfonation level increases. Methanol, the smallest alcohol, diffuses fastest through the ionomers, followed by water and higher alcohols. This data demonstrates that water readily diffuses through the semipermeable membrane, and that the membrane is selective to liquid penetrants depending on their size and polarity.

As described above, various fabrication techniques can be employed to produce the semipermeable membrane. For example, the membrane can be fabricated by a technique selected from the group consisting of casting from a solvent, spray coating, melt processing, and roll casting.

The semipermeable membrane can be employed as a single freestanding membrane, or as a plurality of membranes, or as one or a plurality of layers as a portion of a laminate. For example, the semipermeable membrane can be employed in a semipermeable laminate. The laminate comprises (a) one or a plurality of semipermeable membrane layers produced from an unsulfonated block copolymer comprising polystyrene and polyisobutylene segments, with the membrane layer comprising a sulfonated block copolymer comprising poly (styrene-co-styrene sulfonic acid) segments and polyisobutylene segments, wherein the unsulfonated polystyrene and polyisobutylene block copolymer comprises polystyrene monomer in an amount of from 5% to 90% by weight of the total unsulfonated block copolymer, and wherein from 1 to 70 mole % of the polystyrene monomer in the unsulfonated polystyrene and polyisobutylene block copolymer is converted to styrene sulfonic acid in the sulfonated block copolymer; and (b) a substrate.

The substrate is typically a material capable of accommodating the one or a plurality of semipermeable membrane layers, and can be, for example, a fabric.

In an optional embodiment, a laminate construction can comprise a "sandwich" configuration, i.e., a semipermeable membrane layer, a substrate layer, another semipermeable membrane layer, another substrate layer, and so on, depending upon the particular application of the membrane. Other configurations can comprise variations of the aforementioned sandwich configuration, including a plurality of semipermeable membrane layers, a plurality of substrate layers, and so forth, including mixtures thereof.

In another embodiment, the invention is directed to a semipermeable layer in which the membrane is dispersed throughout the substrate. The semipermeable layer comprises (a) a semipermeable membrane produced from an unsulfonated block copolymer comprising polystyrene and polyisobutylene segments, with the membrane comprising a sulfonated block copolymer comprising poly (styrene-co-styrene sulfonic acid) segments and polyisobutylene segments, wherein the unsulfonated polystyrene and polyisobutylene block copolymer comprises polystyrene monomer in an amount of from 5% to 90% by weight of the total unsulfonated block copolymer, and wherein from 1 to 70 mole % of said polystyrene monomer in the unsulfonated polystyrene and polyisobutylene block copolymer is converted to styrene sulfonic acid in the sulfonated block copolymer; and b) a substrate, wherein the membrane is dispersed throughout the substrate.

Various types of dispersion can include, for example, a dispersion in which the semipermeable membrane is embedded or imbibed into a porous substrate; a dispersion in which the membrane is encapsulated within another material; and a dispersion in which the membrane material is mixed with another material, as in a polymer blend, or in an emulsion in which the membrane phase is comingled with a matrix or liquid, either as a discontinuous, dispersed phase, as a co-continuous phase, or as a matrix (i.e., in which the membrane is the continuous phase).

EXAMPLE

A PS-PIB-PS tri-block copolymer such as TS-3000s (produced by Kuraray Co., Ltd., Tsukuba Research Laboratories, Toukuba City, Japan) was employed as the base polymer for preparation of one embodiment of the semipermeable membrane described herein. Typical properties of this base polymer are shown in Table 1.

TABLE 1

Properties of TS-3000s Block Copolymer.

| Property | TS-3000s |
|---|---|
| Styrene Content (wt. %) | 30 |
| Specific Gravity | 0.95 |
| Hardness (JIS-A) | 56 |
| Tensile Strength (Mpa) | 10.8 |
| Elongation (%) | 440 |

The base copolymer was chemically modified by sulfonation in a solution of dichloromethane and hexane at 50° C. with acetyl sulfate. A detailed description of the sulfonation procedure is found in Mountz, D. A., Reuschle, D. A., Brister, L. B., Storey, R. F., Mauritz, K. A., *ACS Polymer Preprints*, Spring 1997, 39, 383, the disclosure of which is incorporated by reference herein.

The sulfonated PS-PIB-PS samples were then dissolved in 85% by weight toluene and 15% by weight hexyl alcohol to create a solution of 1% polymer by weight. The solutions were formed over a period of 24 hours and then cast into 4-inch diameter polytetrafluoroethylene ("PTFE") petri dishes. 50 ml of a 1% polymer solution was used for each petri dish. Once cast, the open petri dish was set to dry under a hood until a dry film was formed (approximately 2–4 days). Typical film thickness ranged from 2–5 mil depending on the curvature on the bottom surface of the casting dish.

Solutions for sprayed films were made according to the procedure described above resulting in a polymer concentration of 5% by weight. Approximately 50 ml of the polymer solution was sprayed over a 4-inch diameter PTFE dish and was allowed to dry under a hood. An air gun operated at 40 psi was used to spray the polymer solution. The air gun, which is typically used for paint application, resulted in a broad, poorly focused spray, and thus it was difficult to estimate the exact volume of solution that actually resulted in film formation. However, 50 ml of 5% polymer solution resulted in good films. Films used for investigation of transport properties were made by casting the polymer solution (1% by weight) directly onto the surface of an ATR crystal for FTIR investigation.

Figure 1:
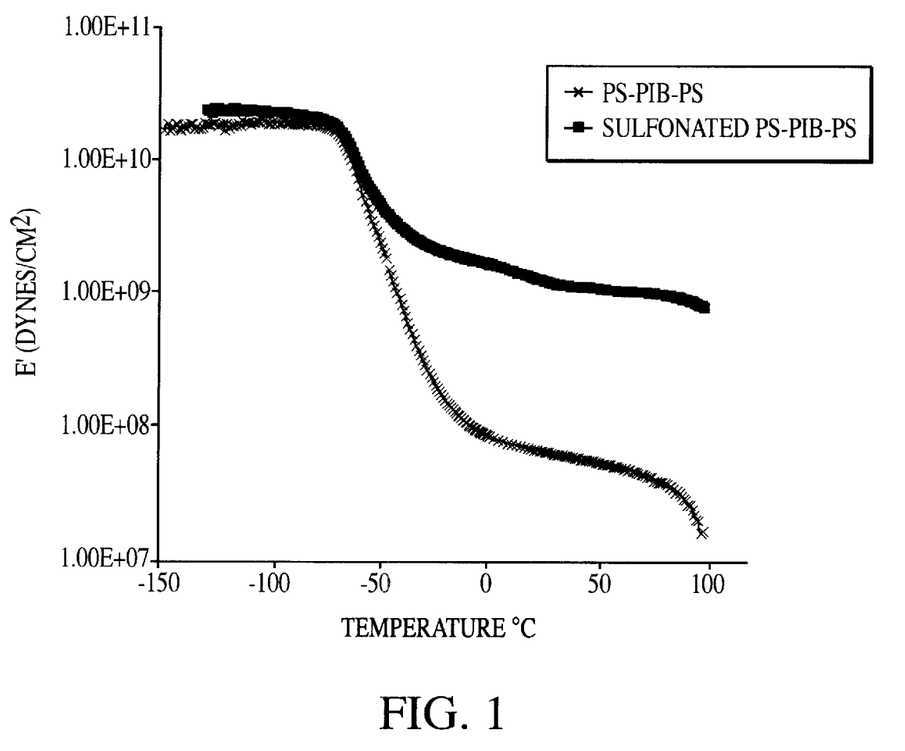
FIG. 1 depicts the value of storage modulus E' plotted as a function of temperature for an unmodified PS-PIB-PS copolymer, and a sulfonated PS-PIB-PS copolymer according to the present invention.
Figure 2:
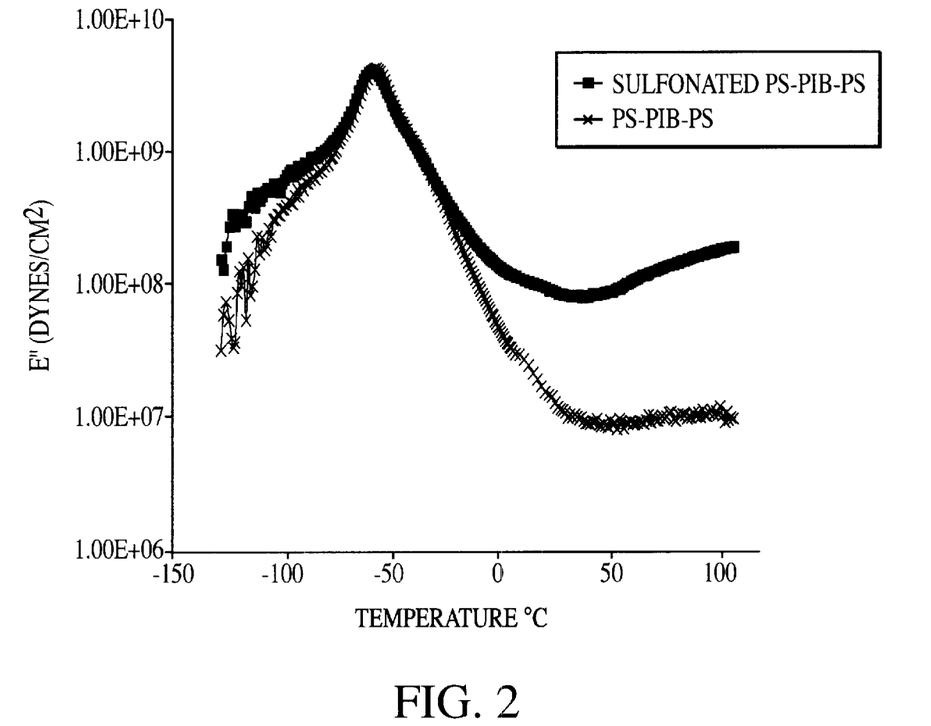
FIG. 2 depicts the value of loss modulus E" plotted as a function of temperature for the unmodified PS-PIB-PS copolymer and the sulfonated PS-PIB-PS copolymer.

Dynamic mechanical properties of the sulfonated PS-PIB-PS block copolymer are shown in FIGS. 1 and 2. The unmodified PS-PIB-PS copolymer is also shown for comparison. FIG. 1 shows storage modulus E' plotted as a function of temperature for the two polymers. Data were taken using an Imass, Inc. Autovibron operated at 1 Hz and a heating rate of 1° C./min.

Sulfonation of the block copolymer results in a much higher rubbery plateau. The sulfonated copolymer was observed to be more thermally stable than the unmodified copolymer with no indication of change in E' at 100° C. The enhancement of the rubbery plateau modulus as a result of sulfonation has been observed for other block copolymers and is believed to be the result of association and hydrogen bonding between the sulfonic acid groups (Mani, S., Weiss, R. A., Williams, C. E., Hahn, S. F., *Macromolecules*, 1999, 32, 3663).

The loss modulus E" of the two polymers is shown in FIG. 2. Data were taken using an Imass, Inc. Autovibron operated at 1 Hz and a heating rate of 1° C./min. These data indicate that sulfonation of the block copolymer does not affect the Tg or the magnitude of the glass transition (E" maxima). The low temperature properties of the polymers remain intact following sulfonation exhibiting a Tg (based on peak magnitude of E") of approximately −60° C. The magnitude of the loss properties for the sulfonated polymer is unchanged in the low temperature region as well. Thus, although sulfonation results in a stiffer material above the glass transition, the low temperature properties associated with PIB chain mobility are not significantly affected. Films formed by these polymers are flexible and exhibit good mechanical integrity.

Transport properties of the sulfonated block copolymer membrane were investigated using a Nicolet Research Series Fourier transform infra-red (FTIR) spectrometer with a horizontal attenuated total reflectance (ATR) cell, and a zinc selenide trapezoidal ATR crystal. The polymer-coated ATR crystal was mounted in a flow-through ATR cell. Liquid penetrants were allowed to pass through the cell, flooding the polymer coated ATR crystal. Diffusion of the penetrant through the polymer film was detected by the infra-red. absorbance. Details regarding the experimental apparatus and methodology used for the diffusion experiments are discussed in Hong, S. U., Barbari, T. A., Sloan, J., J. *Polym. Sci., Polym. Phys. Ed.*, 1997, 35, 1261 and Fieldson, G. T., Barbari, T. A., AIChE J., 1995, 41, 795.

Figure 3:
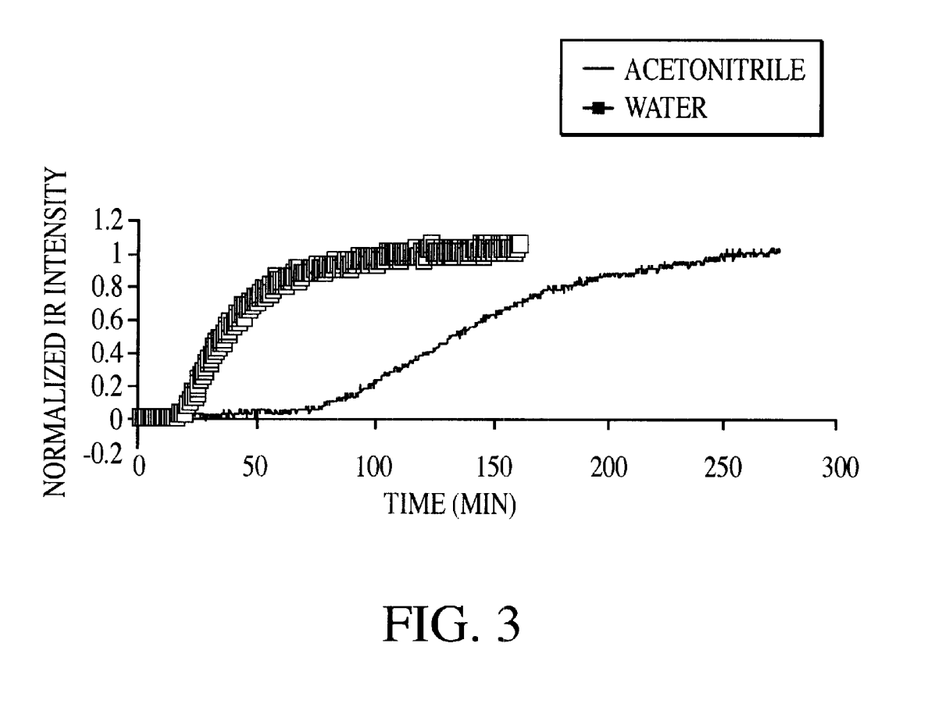
FIG. 3 illustrates the diffusion of acetonitrile and water through the sulfonated PS-PIB-PS copolymer.

Transport experiments were conducted using water, acetonitrile, and a series of alcohols as individual penetrants. Acetonitrile was selected as a penetrant because its chemical structure loosely resembles the chemical agent cyanogen chloride, it exhibits moderate hydrogen bonding characteristics, and it has a very distinguishing feature in the IR spectra. FIG. 3 shows the kinetic plot of the IR intensity over time for water and acetonitrile. Both diffusion curves show the expected "S" shape and appear to be Fickian in nature. The data clearly show that water transports through the film faster than the acetonitrile. The sulfonated block copolymer membrane exhibits a breakthrough time of around 100 minutes for the acetonitrile penetrant. For a protective apparel use of this invention, this breakthrough value surpasses the current military quality assurance specification requirement for acceptance testing of chemical/biological protective gloves. Water molecules transport through the 8 mil membrane in approximately 25 minutes. The data show that the sufonated PS-PIB-PS tri-block copolymer exhibits superior semi-permeable properties for chemical protective clothing compared to the currently often used butyl rubber.

Figure 4:
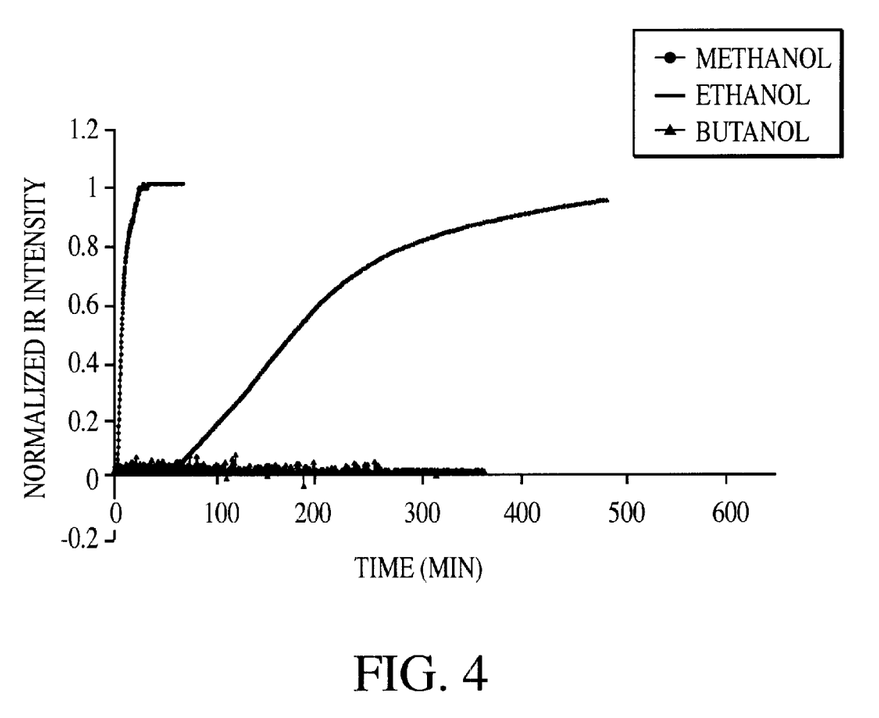
FIG. 4 illustrates the diffusion of various alcohols through the sulfonated PS-PIB-PS copolymer.

FIG. 4 shows the kinetic IR absorbance data for several alcohols with varying aliphatic content. A clear trend becomes apparent, i.e., that smaller size molecules have higher transport rates. Methanol, the smallest alcohol, diffuses very quickly through the membrane, while butanol shows no transport at all over the time scale of the experiment (450 minutes). The perm-selective properties of the sulfonated tri-block copolymer membrane are demonstrated by its size selectivity characteristics with respect to the penetrant. Increasing the aliphatic content of the alcohols by only three $CH_2$ groups results in a significant decrease in transport rate.

Figure 5:
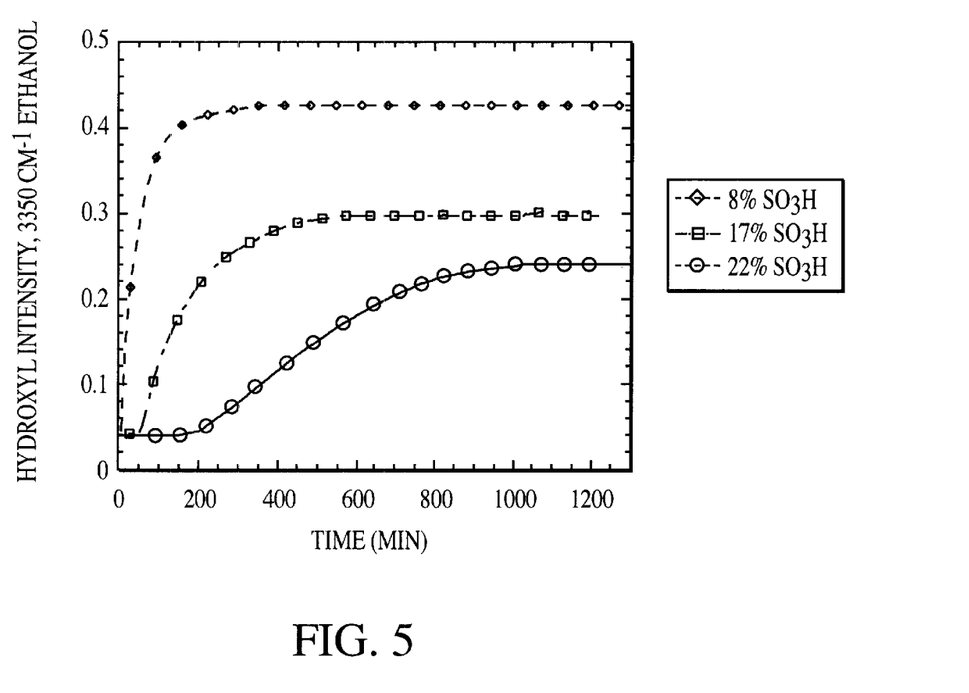
FIG. 5 illustrates IR intensity versus time for ethanol diffusion through each of three sulfonated PS-PIB-PS membranes having different levels of sulfonation.

FIG. 5 illustrates IR intensity versus time for ethanol diffusion through each of three sulfonated PS-PIB-PS membranes having different levels of sulfonation. That is, FIG. 5 shows the absorbance of the hydroxyl group as a function of time for ethanol through PS-PIB-PS block copolymers at three different sulfonation levels. As is evident from FIG. 5, the ethanol diffuses much faster through the PS-PIB-PS block copolymer with the highest sulfonation level. The transport through the film appears to vary as a function of sulfonation level in PS-PIB-PS block copolymers. These data suggest that the sulfonic acid groups enhance the transport rate through the copolymer. The data plotted in FIG. 5 are actual calculated IR hydroxyl intensities derived from the time resolved IR spectra. Therefore, the equilibrium absorbance should be directly related to the amount of ethanol present in the final ethanol/polymer mixture. As is evident from FIG. 5, the higher the sulfonation level, the greater the ethanol solubility in the sulfonated PS-PIB-PS.

Figure 6:
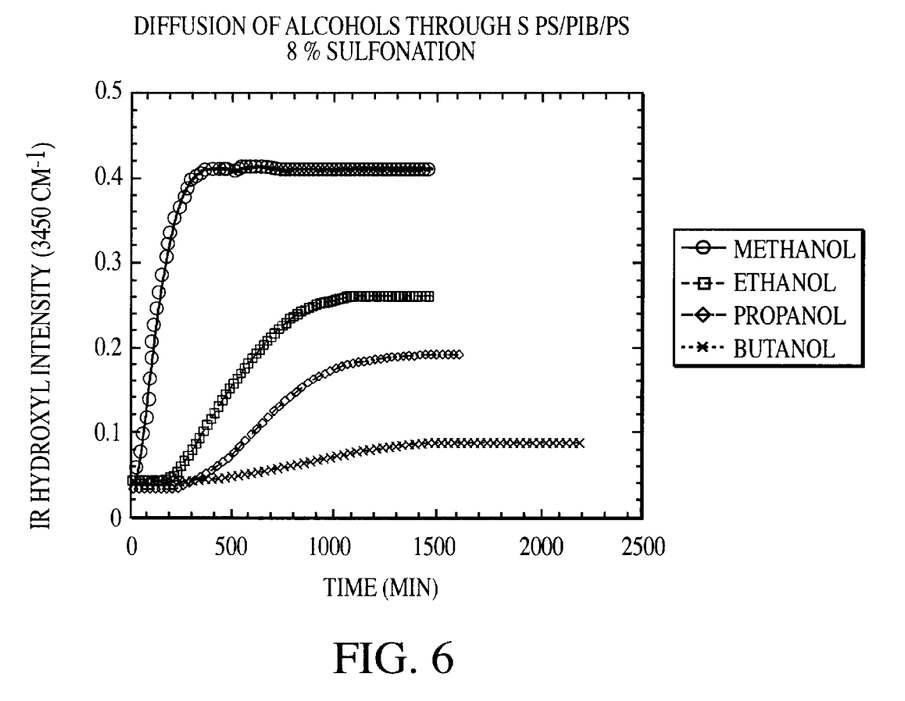
FIG. 6 illustrates FT-IR absorbance data for the appearance of the 3450 cm−1 band of individual alcohols through an 8% sulfonated PS-PIB-PS membrane.

FIG. 6 illustrates FT-IR absorbance data for the appearance of the 3450 cm−1 band of individual alcohols through 8% sulfonated PS-PIB-PS membrane. FIG. 6 shows a comparison for four alcohols diffusing through the sulfonated membrane. The alcohols vary slightly in size. A clear trend is detected that is directly related to the size of the alcohol. The methanol diffuses fastest through the membrane, while the butanol, the largest alcohol, is shown to diffuse at the slowest rate. The data in FIG. 6 are plotted using the absolute IR intensity, where the alcohols with the fastest diffusion rates exhibit the largest band intensities, presumably due to increased solubility of the smaller alcohol molecules.

Figure 7:
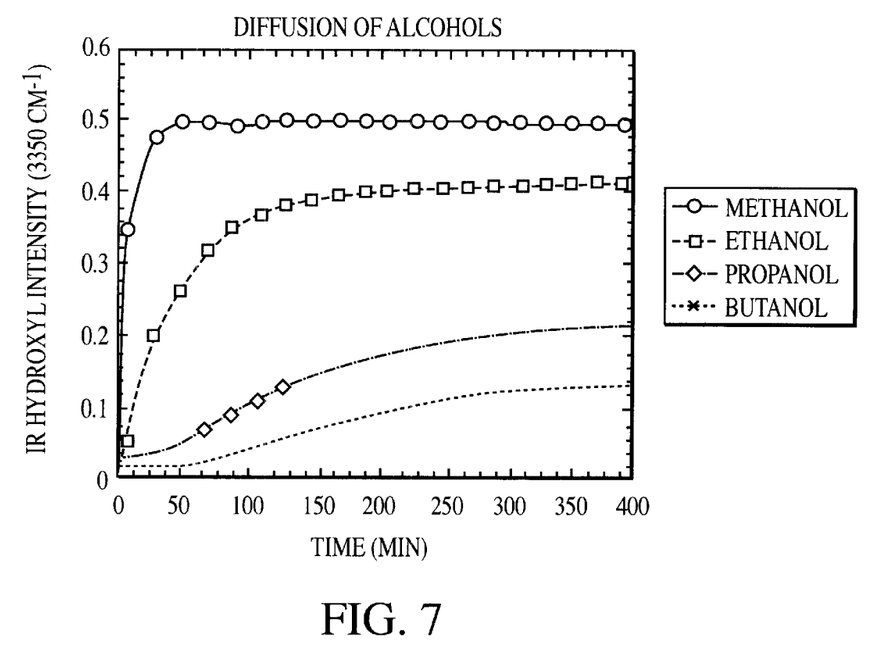
FIG. 7 illustrates FT-IR absorbance data for the appearance of the 3450 cm−1 band for individual alcohols through a 22% sulfonated PS-PIB-PS membrane.

FIG. 7 illustrates FT-IR absorbance data for the appearance of the 3450 cm−1 band for individual alcohols through 22% sulfonated PS-PIB-PS membrane. FIG. 7 shows a comparison for four alcohols diffusing through the 22% sulfonated membrane. Similar to FIG. 6, molecular transport varies according to size of the penetrant. Comparing FIG. 7 to FIG. 6, it is evident that the absolute intensity of the OH peak is greater for individual alcohols in the spectra of the 22% sulfonated membrane than in the 8% sulfonated membrane. This is a direct result of the increased solubility of the alcohols in the 22% membrane over the 8% membrane.

Table 2 presents a comparison of the equilibrium sorption values for the four alcohols in the sulfonated PS-PIB-PS.

TABLE 2

Equilibrium sorption values for sulfonated PS-PIB-PS membranes.

| | % Uptake by Weight | | |
|---|---|---|---|
| Solvent | 8% S | 17% S | 22% S |
| Water | 6 | 9 | 17 |
| Methanol | 36 | 186 | 370 |
| Ethanol | 34 | 82 | 195 |
| n-Propanol | 27 | 34 | 211 |
| n-Butanol | 38 | — | — |

Table 2 illustrates the solubility increase associated with the increase in sulfonation levels. These data confirm the results presented in the FT-IR data, i.e., that solubility varies as a function of percent sulfonation.

Figure 8:
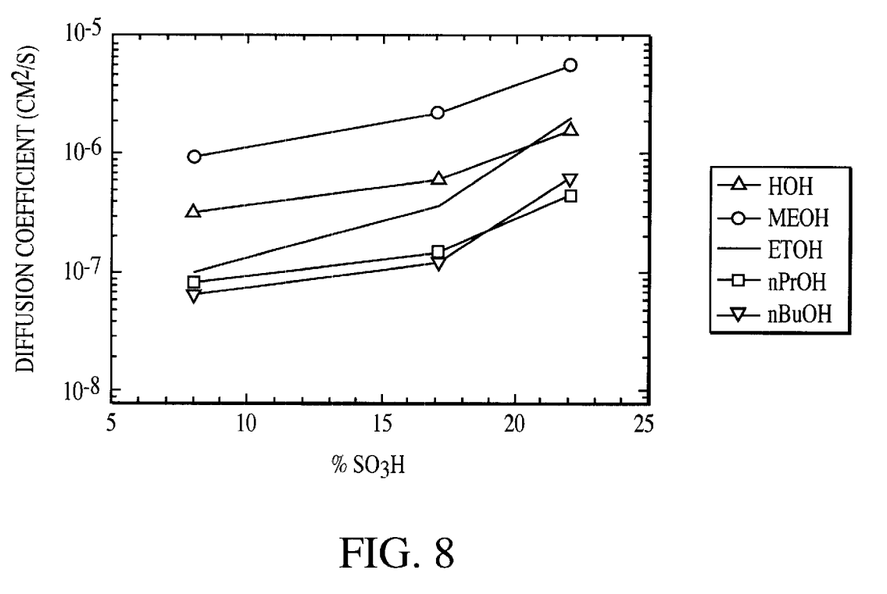
FIG. 8 illustrates the effect of sulfonation levels on the diffusion coefficients for sulfonated PS-PIB-PS membranes.

FIG. 8 illustrates the effect of sulfonation levels on the diffusion coefficients for sulfonated PS-PIB-PS membranes. The effective diffusion coefficient was determined by regressing the aforementioned integrated absorbance data with an FT-IR-Fickian diffusion model using a least squares regression technique. All of the sulfonated PS-PIB-PS samples displayed Fickian behavior. FIG. 8 shows the change in the effective diffusion coefficient with varying sulfonation content for a series of alcohols. The effective diffusion coefficient decreases with increasing sulfonation percentage in the PS-PIB-PS.

Collectively, therefore, the mechanical properties and the ease of processing of the sulfonated block copolymers comprising poly (styrene-co-styrene sulfonic acid) segments and polyisobutylene segments, combined with their ability to transport water and block organic molecules, render these membranes applicable for various applications, such as, for example, chemical and/or biological protective clothing for military applications. For example, the invention can comprise chemical and/or biological protective apparel comprising any of the aforementioned various embodiments of the semipermeable membrane. The unique properties of these polymers are also useful for non-military applications including protective clothing for "first responders" in chemical threat situations, or for hazardous materials handling. The apparel can be selected, for example, from the group consisting of shirts, trousers, overcoats, gloves, overboots, boots, socks, hoods, hats, helmets, eye goggles, and gas masks.

The potential uses for the various embodiments of the semipermeable membrane are numerous, however, and extend beyond the aforementioned protective apparel uses. In another embodiment, the invention can comprise an ion-conducting membrane for use in a fuel cell, wherein the membrane comprises any of the aforementioned various embodiments of the semipermeable membrane.

For example, in a fuel cell comprising a semipermeable laminate, the laminate comprises (a) one or a plurality of semipermeable membrane layers produced from an unsulfonated block copolymer comprising polystyrene and polyisobutylene segments, the membrane layer comprising a sulfonated block copolymer comprising poly (styrene-co-styrene sulfonic acid) segments and polyisobutylene segments, wherein the unsulfonated polystyrene and polyisobutylene block copolymer comprises polystyrene monomer in an amount of from 5% to 90% by weight of the total unsulfonated block copolymer, and wherein from 1 to 70 mole % of the polystyrene monomer in the unsulfonated polystyrene and polyisobutylene block copolymer is converted to styrene sulfonic acid in the sulfonated block copolymer; and (b) a substrate.

In another embodiment, in a fuel cell comprising a semipermeable layer, the layer comprises (a) a semipermeable membrane produced from an unsulfonated block copolymer comprising polystyrene and polyisobutylene segments, the membrane comprising a sulfonated block copolymer comprising poly (styrene-co-styrene sulfonic acid) segments and polyisobutylene segments, wherein the unsulfonated polystyrene and polyisobutylene block copolymer comprises polystyrene monomer in an amount of from 5% to 90% by weight of the total unsulfonated block copolymer, and wherein from 1 to 70 mole % of the polystyrene monomer in the unsulfonated polystyrene and polyisobutylene block copolymer is converted to styrene sulfonic acid in the sulfonated block copolymer; and (b) a substrate, wherein the membrane is dispersed throughout the substrate.

In another embodiment, in a separation membrane capable of separating a first constituent from a second constituent or from a plurality of constituents, the membrane comprises any of the aforementioned various embodiments of the semipermeable membrane.

Furthermore, the membrane can be used in medical applications, such as, for example, in medical equipment comprising any of the aforementioned various embodiments of the semipermeable membrane.

The medical equipment can be selected, for example, from the group consisting of gloves, screens, drapes, masks, and breathable dressings, shirts, trousers, gowns, overboots, socks, hoods, caps, helmets, and eye goggles.

The present invention, therefore, provides a semipermeable membrane that is capable of remaining flexible at a temperature of at least −60° C., and that is selective to liquid penetrants depending on the size and polarity of the penetrants. By virtue of the semipermeable membrane's excellent transport and mechanical properties, and ease of processing, the various embodiments of the membrane advantageously find numerous uses, including in chemical and/or biological protective apparel, as an ion-conducting membrane for use in a fuel cell, and in medical equipment and apparel.

Although the invention has been exemplified as being suitable for use in the aforementioned applications, one skilled in the art can appreciate that the invention could be employed in other services in which a semipermeable membrane characterized by excellent transport and mechanical properties is desired.

While only certain preferred embodiments of this invention have been shown and described by way of illustration, many modifications will occur to those skilled in the art and it is, therefore, desired that it be understood that it is intended herein to cover all such modifications that fall within the true spirit and scope of this invention.

For example, in one embodiment the base, unmodified copolymer has been described as a PS-PIB-PS tri-block copolymer. Instead of being a PS-PIB-PS tri-block copolymer, however, the base copolymer could be any other copolymer which is capable of being sulfonated so as to provide a sulfonated block copolymer comprising poly (styrene-co-styrene sulfonic acid) segments and polyisobutylene segments in a polymeric form suitable for a particular application.

By way of further example of modifications within the scope of this invention, while in one embodiment the substrate has been described as a fabric, the substrate can be any other material that is capable of accommodating thereon the one or a plurality of semipermeable membrane layers, or accommodating therein a dispersion of the membrane material.

The description is intended to illustrate and not limit the scope of the invention which is defined by the full scope of the appended claims, and which invention is entitled to protection within the full scope of the appended claims.

What is claimed is:

1. A semipermeable membrane produced from an unsulfonated block copolymer comprising polystyrene and polyisobutylene segments, said membrane comprising:

a sulfonated block copolymer comprising poly (styrene-co-styrene sulfonic acid) segments and polyisobutylene segments, wherein said unsulfonated polystyrene and polyisobutylene block copolymer comprises polystyrene monomer in an amount of from 5% to 90% by weight of the total unsulfonated block copolymer, and wherein from 1 to 70 mole % of said polystyrene monomer in the unsulfonated polystyrene and polyisobutylene block copolymer is converted to said styrene sulfonic acid in the sulfonated block copolymer.

2. A semipermeable membrane according to claim 1, wherein said unsulfonated polystyrene and polyisobutylene block copolymer comprises polystyrene monomer in an amount of from 5% to 60% by weight of the total unsulfonated block copolymer, and wherein up to 50 mole % of said polystyrene monomer in the unsulfonated polystyrene and polyisobutylene block copolymer is converted to said styrene sulfonic acid in the sulfonated block copolymer.

3. A semipermeable membrane according to claim 1, wherein said unsulfonated polystyrene and polyisobutylene block copolymer comprises polystyrene monomer in an amount of from 10% to 50% by weight of the total unsulfonated block copolymer, and wherein from 1 to less than 30 mole % of said polystyrene monomer in the unsulfonated polystyrene and polyisobutylene block copolymer is converted to said styrene sulfonic acid in the sulfonated block copolymer.

4. A semipermeable membrane according to claim 1, wherein said unsulfonated polystyrene and polyisobutylene block copolymer comprises polystyrene monomer in an amount of from 20% to 70% by weight of the total unsulfonated block copolymer, and wherein at least 20 mole % of said polystyrene monomer in the unsulfonated polystyrene and polyisobutylene block copolymer is converted to said styrene sulfonic acid in the sulfonated block copolymer.

5. A semipermeable membrane according to claim 1, said semipermeable membrane further comprising an additive selected from the group consisting of polymers, chemical stabilizers, bio-active species, and metals, and mixtures thereof.

6. A semipermeable membrane according to claim 5, wherein said chemical stabilizer is an anti-oxidant.

7. A semipermeable membrane according to claim 5, wherein said bio-active species is an antiseptic.

8. A semipermeable membrane according to claim 1, wherein a proton of said sulfonic acid is replaced with an organic or inorganic cation.

9. A semipermeable membrane according to claim 1, wherein said membrane has a thickness of up to about 5 mm.

10. A semipermeable membrane according to claim 1, wherein said membrane has a thickness of from about 0.05 mm to about 2 mm.

11. A semipermeable membrane according to claim 1, wherein said membrane is fabricated by a technique selected from the group consisting of casting from a solvent, spray coating, melt processing, and roll casting.

12. A semipermeable membrane according to claim 1, wherein said membrane is capable of remaining flexible at a temperature of at least −60° C.

13. A semipermeable membrane according to claim 1, wherein said membrane is selective to liquid penetrants depending on the size and polarity of said penetrants.

14. A semipermeable membrane according to claim 1, wherein said membrane has sufficient selectivity so as to be capable of allowing water to diffuse therethrough at a higher rate than all organic liquids having a molecular weight higher than that of methanol.

15. A semipermeable membrane produced from an unsulfonated polystyrene-polyisobutylene-polystyrene block copolymer, said membrane comprising:

a sulfonated block copolymer comprising poly (styrene-co-styrene sulfonic acid) segments and polyisobutylene segments, wherein said unsulfonated polystyrene-polyisobutylene-polystyrene block copolymer comprises polystyrene monomer in an amount of from 5% to 90% by weight of the total unsulfonated block copolymer, and wherein from 1 to 70 mole % of said polystyrene monomer in the unsulfonated polystyrene-polyisobutylene-polystyrene block copolymer is converted to said styrene sulfonic acid in the sulfonated block copolymer.

16. A semipermeable laminate comprising:

(a) one or a plurality of semipermeable membrane layers produced from an unsulfonated block copolymer comprising polystyrene and polyisobutylene segments,
said membrane layer comprising a sulfonated block copolymer comprising poly (styrene-co-styrene sulfonic acid) segments and polyisobutylene segments, wherein said unsulfonated polystyrene and polyisobutylene block copolymer comprises polystyrene monomer in an amount of from 5% to 90% by weight of the total unsulfonated block copolymer, and wherein from 1 to 70 mole % of said polystyrene monomer in the unsulfonated polystyrene and polyisobutylene block copolymer is converted to said styrene sulfonic acid in the sulfonated block copolymer; and (b) a substrate.

17. A semipermeable laminate according to claim 16, wherein said substrate is a fabric.

18. A semipermeable layer comprising:

(a) a semipermeable membrane produced from an unsulfonated block copolymer comprising polystyrene and polyisobutylene segments,
said membrane comprising a sulfonated block copolymer comprising poly (styrene-co-styrene sulfonic acid) segments and polyisobutylene segments, wherein said unsulfonated polystyrene and polyisobutylene block copolymer comprises polystyrene monomer in an amount of from 5% to 90% by weight of the total unsulfonated block copolymer, and wherein from 1 to 70 mole % of said polystyrene monomer in the unsulfonated polystyrene and polyisobutylene block copolymer is converted to said styrene sulfonic acid in the sulfonated block copolymer; and (b) a substrate,
wherein said membrane is dispersed throughout said substrate.

19. Chemical and/or biological protective apparel comprising the semipermeable membrane according to claim 1.

20. The apparel according to claim 19, wherein said apparel is selected from the group consisting of shirts, trousers, overcoats, gloves, overboots, boots, socks, hoods, hats, helmets, eye goggles, and gas masks.

21. An ion-conducting membrane for use in a fuel cell, said membrane comprising the semipermeable membrane according to claim 1.

22. A fuel cell comprising a semipermeable laminate, said laminate comprising:

(a) one or a plurality of semipermeable membrane layers produced from an unsulfonated block copolymer comprising polystyrene and polyisobutylene segments,
said membrane layer comprising a sulfonated block copolymer comprising poly (styrene-co-styrene sulfonic acid) segments and polyisobutylene segments, wherein said unsulfonated polystyrene and polyisobutylene block copolymer comprises polystyrene monomer in an amount of from 5% to 90% by weight of the total unsulfonated block copolymer, and wherein from 1 to 70 mole % of said polystyrene monomer in the unsulfonated polystyrene and polyisobutylene block copolymer is converted to said styrene sulfonic acid in the sulfonated block copolymer; and (b) a substrate.

23. A fuel cell comprising a semipermeable layer, said layer comprising:

(a) a semipermeable membrane produced from an unsulfonated block copolymer comprising polystyrene and polyisobutylene segments,
said membrane comprising a sulfonated block copolymer comprising poly (styrene-co-styrene sulfonic acid) segments and polyisobutylene segments, wherein said unsulfonated polystyrene and polyisobutylene block copolymer comprises polystyrene monomer in an amount of from 5% to 90% by weight of the total unsulfonated block copolymer, and wherein from 1 to 70 mole % of said polystyrene monomer in the unsulfonated polystyrene and polyisobutylene block copolymer is converted to said styrene sulfonic acid in the sulfonated block copolymer; and (b) a substrate, wherein said membrane is dispersed throughout said substrate.

24. A separation membrane capable of separating a first constituent from a second constituent or from a plurality of constituents, said membrane comprising the semipermeable membrane according to claim 1.

25. Medical equipment comprising the semipermeable membrane according to claim 1.

26. The medical equipment according to claim 25, wherein said equipment is selected from the group consisting of gloves, screens, drapes, masks, and breathable dressings, shirts, trousers, gowns, overboots, socks, hoods, caps, helmets, and eye goggles.

* * * * *